United States Patent [19]

Livick

[11] 4,134,576
[45] Jan. 16, 1979

[54] SAFETY CARRIAGE FOR SUPPORTING AND GUIDING AN ACETYLENE TORCH

[76] Inventor: Lester R. Livick, 15106 Beatty St., San Leandro, Calif. 94579

[21] Appl. No.: 830,919

[22] Filed: Sep. 6, 1977

[51] Int. Cl.² .................................................. B23K 37/00
[52] U.S. Cl. .......................................... 266/68; 266/48
[58] Field of Search ..................... 266/48, 51, 66, 67, 266/68, 70, 71, 74, 75, 76

[56] References Cited

U.S. PATENT DOCUMENTS

| 1,237,534 | 8/1917 | Martin | 266/48 X |
| 3,008,514 | 11/1961 | Daly | 266/48 X |
| 3,174,736 | 3/1965 | Cameron | 266/66 |
| 3,677,515 | 7/1972 | Fassler | 266/48 X |
| 4,050,680 | 9/1977 | Sweeney | 266/48 |

Primary Examiner—Roy Lake
Assistant Examiner—Paul A. Bell

Attorney, Agent, or Firm—William R. Piper

[57] ABSTRACT

A safety carriage for supporting and guiding an acetylene torch in which the torch nozzle can be spaced a desired distance above the work being cut by the flame and the carriage has an asbestos lined pan underlying the operator's hand for protecting it. The device can be guided along a line which is to be cut by the torch flame. An anti-glare shield supporting frame can be attached to the torch for protecting the operator's eyes and this same frame also supports an asbestos shield which is positioned directly behind the torch nozzle and in front of the pan to prevent sparks from the torch flame striking the operator's hand. A frame supporting cross arm with rollers at its ends can be used for moving the torch nozzle in an arc for making a circular cut having a large radius or a center pivot can be substituted for cutting a smaller circle.

1 Claim, 6 Drawing Figures

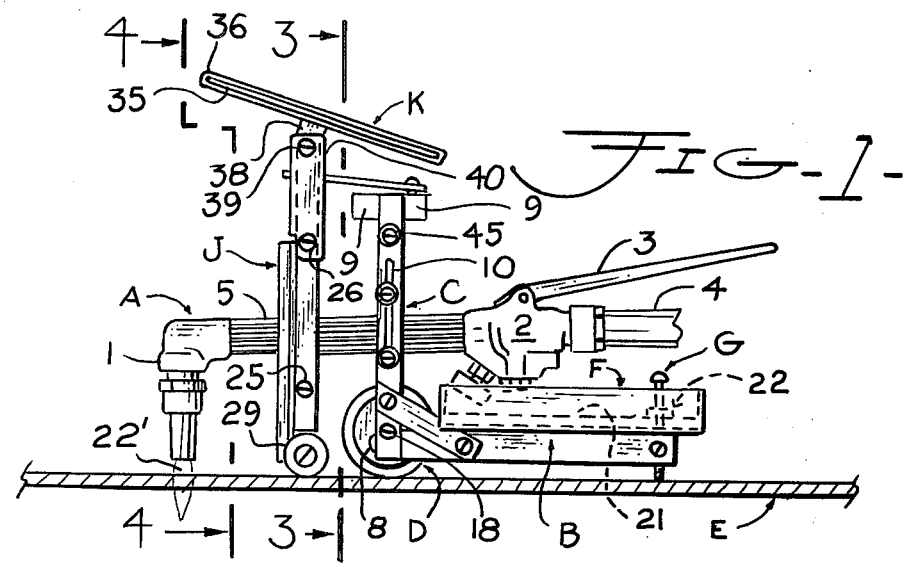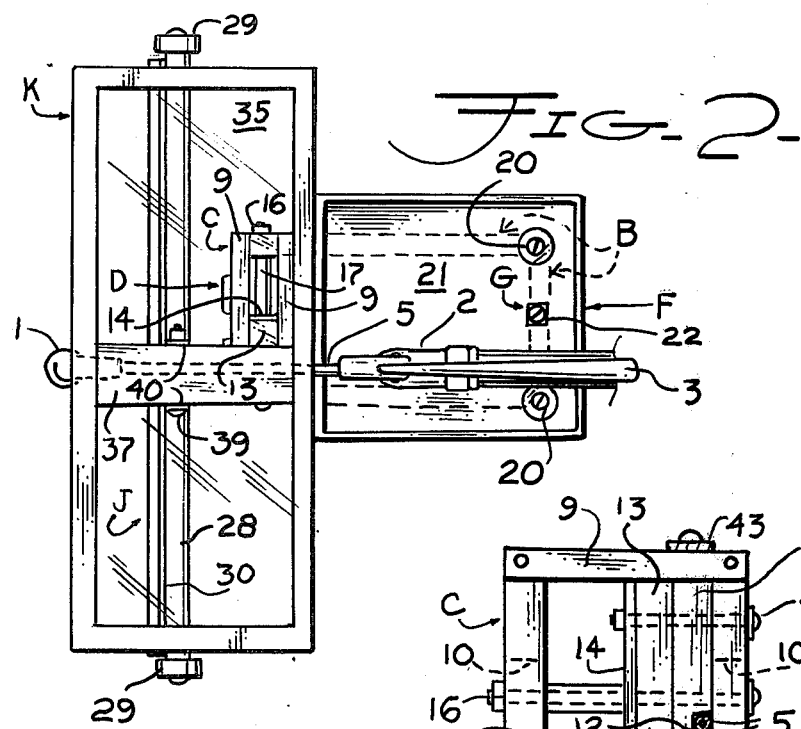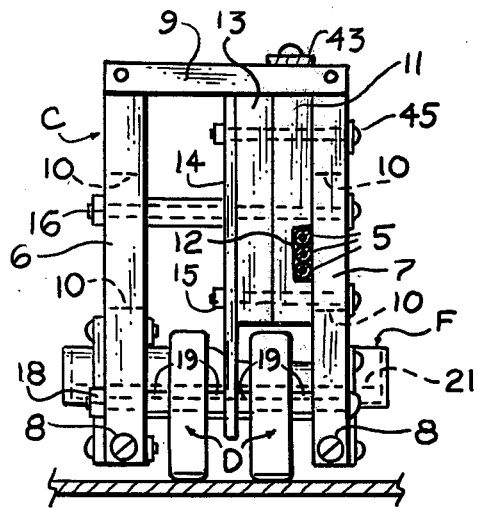

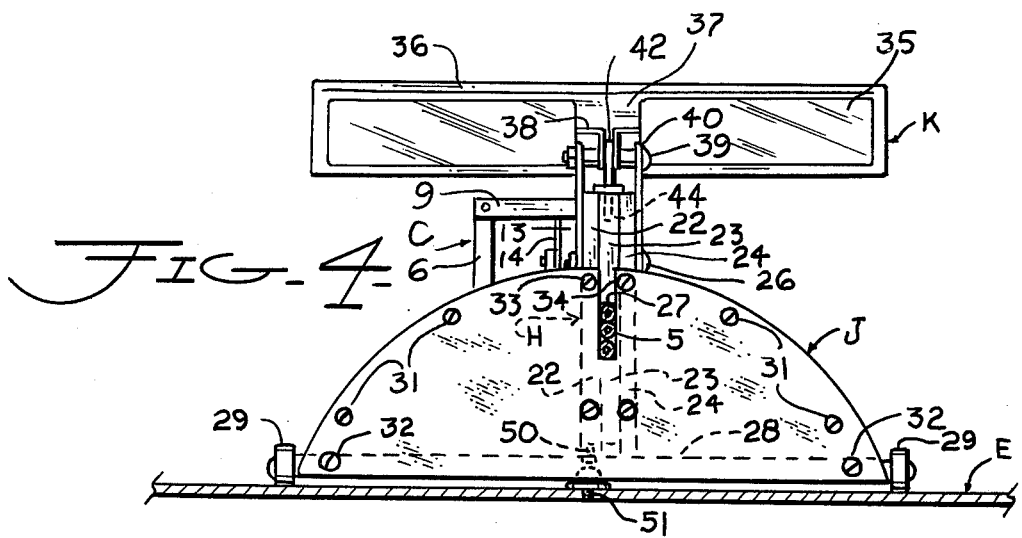
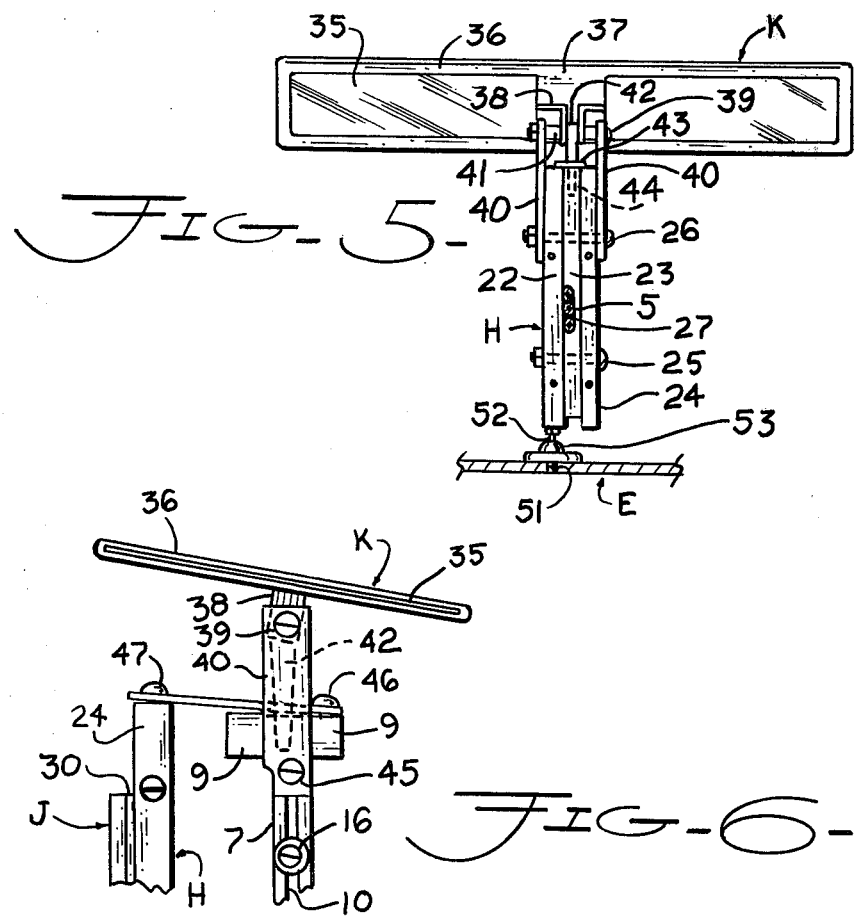

SAFETY CARRIAGE FOR SUPPORTING AND GUIDING AN ACETYLENE TORCH

SUMMARY OF THE INVENTION

An object of my invention is to provide a device of the type described in which the acetylene torch is supported and the torch nozzle can be spaced a desired distance above the surface of the material being cut by the torch flame. The device supports the torch by wheels which also quide the torch nozzle along the line to be cut. The operator's hand is protected by an asbestos lined pan and his eyes are protected by an adjustable anti-glare shield. An asbestos shield is positioned between the torch nozzle and the operator's hand for protecting the hand from any flying sparks. A roller supported cross arm can be used when the operator wishes to make a circular cut having a large radius or a center pivot can be substituted for the cross arm when making a circular cut with a short radius.

BRIEF DESCRIPTION OF THE DRAWINGS

FIG. 1 is a side elevation of the device.
FIG. 2 is a top plan view of FIG. 1.
FIG. 3 is a transverse vertical section taken along the line 3—3 of FIG. 1.
FIG. 4 is another transverse vertical section taken along the line 4—4 of FIG. 1, and illustrates a front view of the asbestos shield and the frame supporting cross arm with rollers mounted at its outer ends.
FIG. 5 is a view similar to FIG. 4, except that a center pivot for the device has been substituted for the cross arm. This is done when cutting circles with a short radius.
FIG. 6 illustrates a portion of the device to show how the anti-glare shield can be moved to a different position on the device.

DESCRIPTION OF THE PREFERRED EMBODIMENT

In carrying out my invention I show a standard acetylene torch, indicated generally at A in FIG. 1, and it has a nozzle 1, a valve 2, controlled by a handle 3, and a hose 4 feeds gas and is controlled by the operator actuating the handle. The torch has three tubes 5 extending from the valve 2 to the nozzle 1.

I provide a torch supporting and guiding carriage and this comprises a base frame B, and an upright frame C, supported by the base frame, as shown in FIG. 1. A front elevation of the upright frame C is shown in FIG. 3, and it consists of side members 6 and 7 connected to the base frame B, by screws 8, and interconnected at their tops by two cross members 9. Each of the two side members 6 and 7 has a vertical slot 10 therein. A vertically adjustable torch tube supporting member 11 is positioned adjacent to the frame side member 7 and it has a cut out portion 12 for receiving the three torch tubes 5. A spacing block 13 is arranged along one side of the torch tube supporting member 11 and a strap 14 is held against the block 13 by a bolt 15 that extends through aligned openings in the members 11 and 13, and through the slot 10 in the side member 7. Another longer bolt 16, shown in FIG. 3, extends through the slots 10 in the two side members 6 and 7, and through aligned openings in the members 11, 13 and 14. A spacing sleeve 17 is mounted on the portion of the bolt lying between the strap 14 and the side member 6 and holds the strap tightly against the spacing block 13.

An axle in the shape of an elongated bolt 18 extends between the side members 6 and 7 of the upright frame C, and has wheels D rotatably mounted thereon, as shown in FIG. 3. Spacing sleeves 19 are mounted on the axle 18 and placed between the wheels D, and the side members 6 and 7 and between the wheels and the strap 14. The wheels support the upright frame C with its base frame B. It is possible to loosen the bolts 15 and 16 and vertically adjust the torch tube supporting member 11 and the spacing block 13 to position the torch head 1 the desired distance above the work E, which is to be cut, see both FIGS. 1 and 3. In this way, the device can be used to accommodate acetylene torches of different sizes.

Referring to FIGS. 1 and 2, it will be seen that the base frame B of the carriage supports a pan F, and screws 20 secure the pan to the frame. An asbestos lining 21 covers the bottom of the pan and will protect the operator's hand from the heat generated by the torch flame 22' when the device is in operation and the hand of the operator grasps the torch handle 3 for controlling the flow of gas through the torch valve 2 and for guiding and moving the device over the work sheet E as the torch flame makes its cut. It is possible to adjust the outlet end of the nozzle 1 so that it is approximately one-eighth to three-sixteenths of an inch above the surface of the work sheet E. I accomplish this by mounting an adjusting screw G, in the bottom of the pan F, and have it extend through a threaded opening in the base frame B. This screw G can be adjusted for raising or lowering the base frame B with respect to the work sheet E on which the lower end of the screw rests and this will rock the carriage on the axle 18 and raise or lower the nozzle 1 with respect to the work sheet. A lock nut 22 is mounted on the adjusting screw G, and will prevent the accidental rotation of the screw. The screw G rides over the surface of the work sheet E as the operator moves the carriage and the torch A over the surface to be cut.

If the operator wishes to cut a large circle in the work sheet E, he first drills a hole or recess in the work sheet which will be the center of the circular cut. In FIGS. 1, 3 and 4, I show an attachemnt H for the torch A which is used when cutting a large radius circle. A front elevation of the attachment H, is illustrated in FIG. 5 and it comprises three vertical members 22, 23 and 24 that are held together by transversely extending bolts 25 and 26. The center member 23 has a recess 27 for receiving the torch tubes 5. A cross arm 28 is removably secured to the lower ends of the members 22 and 24 by screws, not shown. The outer ends of the cross arm is supported by rollers 29, as shown in FIG. 4, and these ride on the upper surface of the work sheet E.

A threaded stud 50 has its upper end screwed into a center threaded opening in the cross arm 28 and the protruding portion of the stud is received in an opening 51 formed in the work sheet E. This opening 51 is the center of the large circle which is to be cut by the torch. The operator moves the frame H along the torch tubes 5 until the torch head 1 is the desired distance from the center hole 51. He then adjusts the screw G to lift the wheels D above the work piece E. The torch can now be ignited and the flame 22' will make a circular cut in the work piece E as the operator rotates the torch supporting device around the opening 51 in the work piece as a center.

An asbestos shield J, is secured to a supporting plate 30 by screws 31, see FIG. 4, and screws 32 and 33 secure the shield J, and plate 30, to the cross arm 28 and to the members 22 and 24 for the attachment H. Both the shield J, and plate 30 have a vertical slot 34 for receiving the torch tubes 5.

The attachment H, can be moved to the desired position along the torch tubes 5 and then secured in place by tightening the bolts 25 and 26. An anti-glare shield K, is supported by the attachment H, and FIGS. 5 and 6 show the shield K with its anti-glare glass 35 mounted in a metal frame 36 which has a central frame member 37 underlying the glass. Angle-shaped brackets 38 are secured in spaced apart relation to the central member 37 and they are pivotally mounted on a transversely extending bolt 39 that in turn extends through the upper ends of a pair of straps 40. Spacing sleeves 41, see FIG. 5, are mounted on the bolt 39 and positioned between the straps 40 and the brackets 38. A center anchor pin 42 has its upper end placed between the brackets and pivotally connected to the bolt 39. A perforated strip 43 has one of its openings aligned with a vertical bore 44 provided in the upper end of the center vertical member 23 of the attachment H, and the lower end of the anchor pin 42 extends through the opening in the strip 43 and into the bore 44. The lower ends of the pair of straps 40 are secured to the adjacent sides of the two side members 22 and 24 of the attachment by the bolt 26, see also FIG. 1. The anti-glare shield K may be swung into a desired angle and frictionally held in position by tightening the bolt 39.

It is possible to remove the bolt 26 and free the straps 40 and anchor pin 42 so that the latter may be lifted from the bore 44 in the center member 23 and moved to the right in FIG. 1 until the pin is aligned with a desired opening in the perforated strip 43 and then the pin 42 is inserted into this opening and the lower ends of the straps 40 secured to the bolt 26. This adjustment will move the anti-glare shield to the right in FIG. 1 into the new position.

Should the operator want to move the anti-glare shield K, still further to the right in FIG. 1, he can release the straps 40 from the bolt 26 and move the anchor pin 42 to align with and be received by another opening in the perforated strip 43. FIG. 6 shows the straps 40 freed from the bolt 26 and connected to a bolt 45 that extends transversely through the members 7, 11 and 13, see also FIG. 3. The perforated strip 43 in this arrangement has one end secured to the cross member 9 of the frame C by a screw 46, as shown in FIG. 6, and has its other end secured to the frame H by a screw 47.

In FIG. 5, I have removed the cross arm 28 with its rollers 29 and have also removed the asbestos shield J with its supporting plate 30. In their place I use a center pivot L. The center pivot L, is used when cutting small radius circles in the work piece and it comprises a threaded stud 52 whose upper end is received in a threaded bore in the bottom of the frame member 22. A foot piece 53 has an axial threaded opening for receiving the stud 52 and the lower exposed end of the stud is received in the opening 51 in the work piece E. The operation of the device for making small radius circular cuts is the same as when making large radius circular cuts, the only difference being that for the small radius cuts the center pivot L, is used in place of the cross arm 28.

It will be seen from the above description that the operator may use the device for making straight line cuts in the work piece and the wheels D, are used in this operation. The operator's hand is protected by the asbestos lined pan F. When large circles are to be cut in the work piece E, the attachment frame H, is used with the cross arm 22 and the rollers 29 are used. Then when small radius circles are to be cut, the cross arm 22 is removed and the center pivot L, is used. All of these features have been described in detail.

I claim:

1. A carriage for supporting and guiding a standard acetylene torch having a plurality of parallely arranged gas conveying tubes in which the gases are controlled by a hand operated valve;
   (a) a first vertically extending frame adjustably connected to the tubes for supporting the torch, the frame having wheels for movably supporting it on the work sheet, and the torch having a nozzle pointing to the work sheet; whereby the frame can be guided for causing the flame from the nozzle to cut the work sheet;
   (b) an anti-glare shield and means for adjustably connecting the shield to said frame;
   (c) a second vertically extending frame adjustably connected to the torch tubes and positioned between said first frame and the torch nozzle, the second frame having a cross arm with rollers at its ends for riding on the work sheet, the center of the cross arm being rotatably connected to the lower end of the second frame; and
   (d) said second frame being adjustable on the torch tubes with respect to said first frame for raising the first frame to lift its wheels above the work sheet and permit an operator to swing said cross arm about its center so that the torch flame will make an arcuate cut in the work sheet.

* * * * *